Nov. 29, 1938.  E. J. F. REY  2,138,645
SORTING MACHINE
Filed July 26, 1934   9 Sheets-Sheet 1

FIG.1.

INVENTOR.
Emile Jean François Rey
BY Cooper, Kerr + Dunham
ATTORNEYS.

Nov. 29, 1938.  E. J. F. REY  2,138,645

SORTING MACHINE

Filed July 26, 1934   9 Sheets-Sheet 6

INVENTOR.
Emile Jean Francois Rey
BY Cooper, Kent+Dunham
ATTORNEYS.

Nov. 29, 1938.　　　E. J. F. REY　　　2,138,645
SORTING MACHINE
Filed July 26, 1934　　　9 Sheets-Sheet 7

INVENTOR.
Emile Jean Francois Rey
By Cooper, Kerr Dunham
ATTORNEYS.

Nov. 29, 1938.　　　　E. J. F. REY　　　　2,138,645
SORTING MACHINE
Filed July 26, 1934　　　9 Sheets-Sheet 9

INVENTOR.
Emile Jean Francois Rey
BY Cooper, Kent & Dunham
ATTORNEYS.

Patented Nov. 29, 1938

2,138,645

UNITED STATES PATENT OFFICE 2,138,645

SORTING MACHINE

Emile Jean Francois Rey, Roanne, France, assignor to Papeteries Navarre, Lyon, France, a limited liability company Application July 26, 1934, Serial No. 737,129
In France July 29, 1933

27 Claims. (Cl. 209—75)

This invention relates to a machine for sorting sheet material such as paper. The machine can be employed in all paper industries where sorting has to be done and also in all other industries where the material is produced in sheets and where the defects which may be found in these sheets and which necessitate their rejection are of a similar nature to those found in paper sheets.

It is among the objects of my invention to provide a machine for sorting sheets in accordance with desired qualities prescribed for a normal or standard sheet of paper or of other sheet material.

Another object of the invention is to provide a machine having mechanism to reject sheets which are too thick or plaited or which contain any impurities such as splinters of wood or of undigested pulp, sand, metallic particles, dirt, and other kinds of foreign materials; to reject sheets which are longer or shorter than a predetermined or normal length; to reject sheets wanting in the degree of opacity desired; to reject sheets having holes and tears; to reject sheets defective because of the presence of creases and crumpling; to reject sheets having blemishes and stains; to reject sheets narrower than a predetermined desired width; to reject sheets having a color or tint different from the color or tint desired, and to reject sheets which are either overweight or underweight of the desired weight.

Another object of the invention is to provide mechanism enabling the sorting of sheets in accordance with the causes which render them acceptable or non-acceptable.

Another object of the invention is to provide a machine enabling the testing of sheets of paper or of other sheet material which automatically tests for defects affecting size, thickness, opacity, color and weight, and which has provisions for enabling variation of permissible tolerances of these different qualities in sheets which are acceptable as normal.

With these and incidental objects in view the invention consists of certain novel features of construction and combination of parts, the essential elements of which are set forth in the appended claims and a preferred embodiment of which is described hereinafter with reference to the drawings which comprise and form part of the specification.

Figure 1:
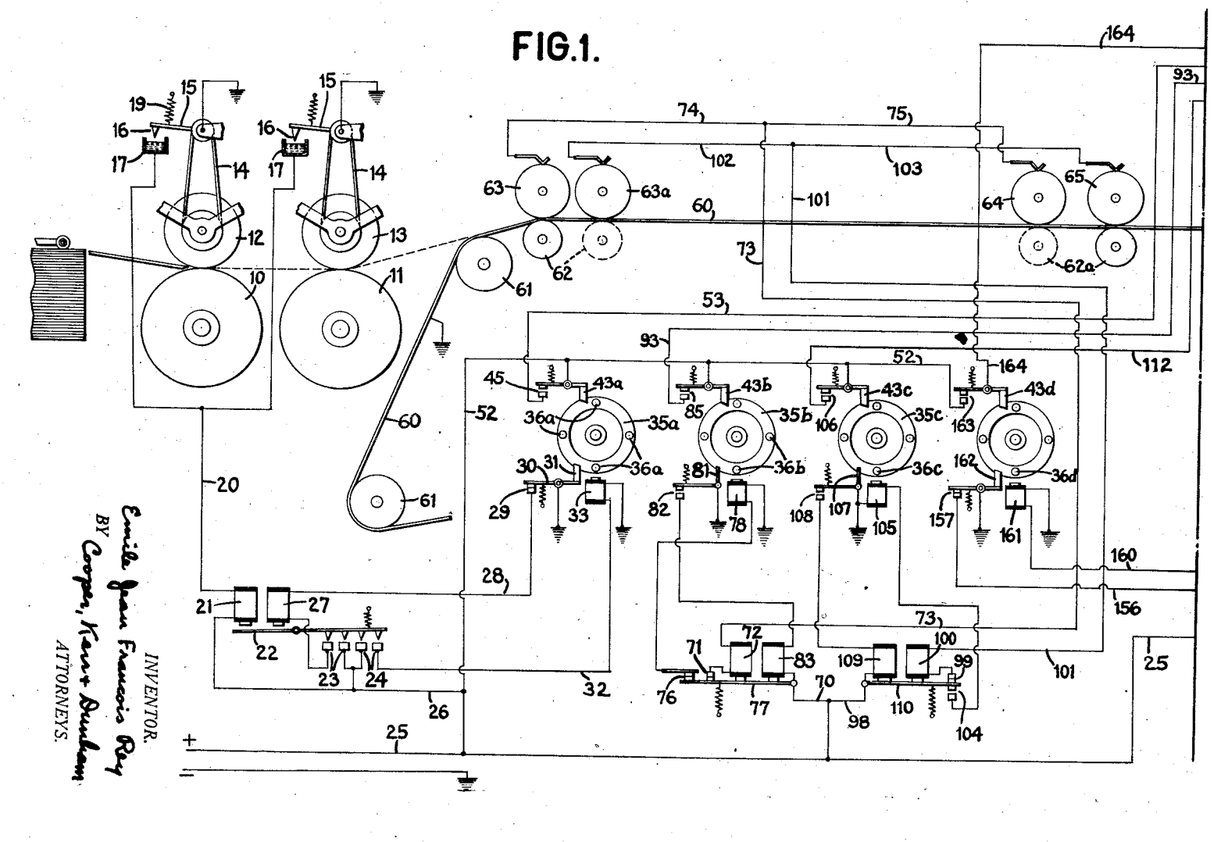
Figs. 1, 2 and 3, when combined, show the various controlling circuits and a diagrammatic elevation of the mechanism of the machine.
Figure 2:
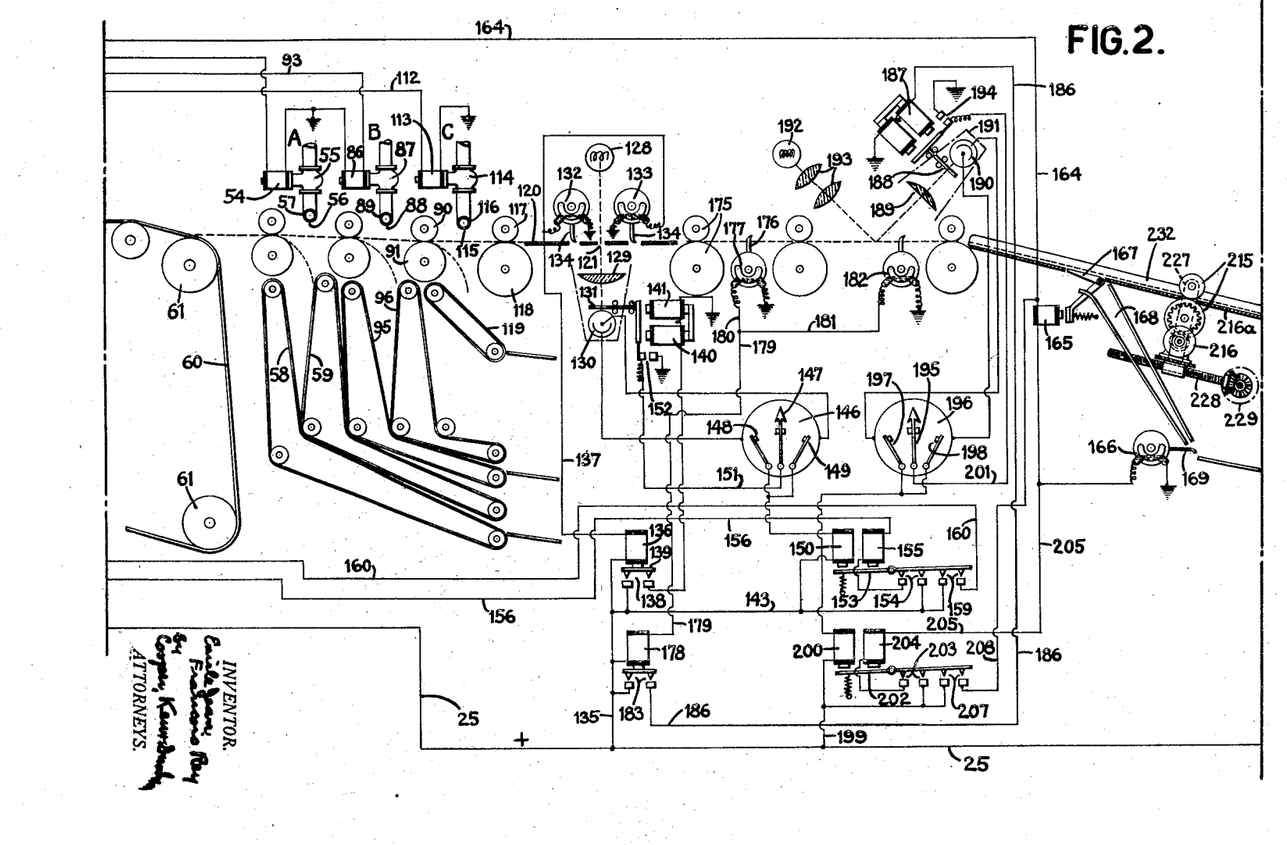
Figure 3:
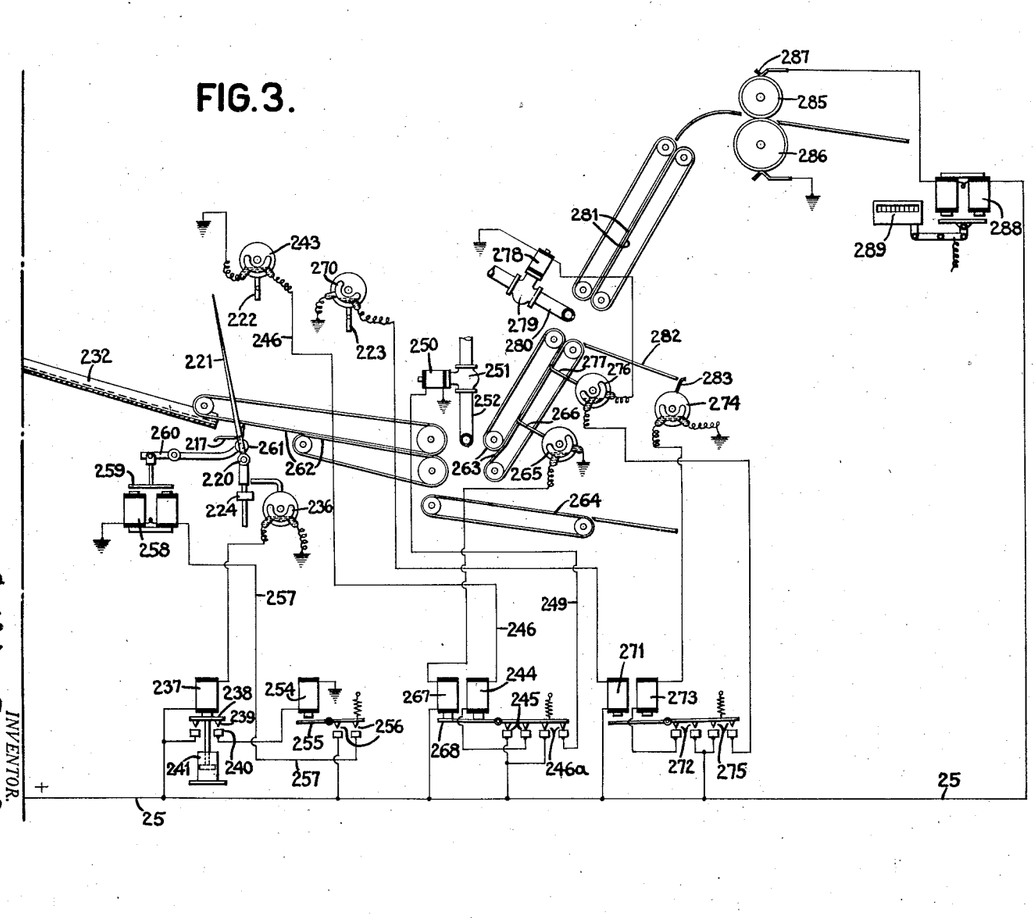

The sheets of paper or of other material which are to be sorted are fed to the machine by a feeder. This feeder may be of the kind that is generally used for feeding paper to printing machines or of any other well known kind. The sorting machine is operated in timed relation with the feeding of the successive sheets from the feeding machine. The sorting machine of the present invention automatically tests sheets of paper passing therethrough and sorts the same in accordance with the quality as determined in the various tests. The sheets which are accepted as normal are sorted, counted and collected at a receiving station located at the end of the machine, Fig. 3. A general diagrammatic layout of the machine is shown in Figs. 1, 2 and 3. The paper feeding machine continuously feeds sheets of paper to the sorting machine while the sorting machine is operating. The sheets are advanced through the machine by rollers which rotate continuously in timed relation to each other. Two of these rollers 10, 11 which are shown at the left end of Fig. 1, extend transverse to the frame of the machine and form a part of the mechanism by which the presence of any irregularity is detected which manifest itself in excessive thickness, wheresoever located upon a sheet. This mechanism includes two rows of steel rollers 12 and 13 which are staggered in respect to each other (some of which are shown in plan in Fig. 20) with the rollers in one row opposite spaces between rollers in the other row so that the entire width of the sheets may be sensed for irregularities in thickness. The row of rollers 12 is mounted immediately above roller 10, and the row of rollers 13 is mounted immediately above roller 11. The sheets pass between the upper and lower rollers, and the upper rollers 12 and 13 are adjustably mounted so that the normal space between the upper rollers and the lower rollers may be accurately determined and set in accordance with the thickness of the paper desired to be accepted. The upper rollers each have a pulley and belt connection (14) with an arm 15 carrying a contact member 16. This contact member is arranged to descend into a mercury cup 17 to close a circuit whenever the upper rollers are rotated sufficiently to cause the required displacement of arm 15. Springs 19 are of such strength as to oppose minor oscillations of the contact arms 15. In adjusting this mechanism upper rollers 12 and 13 are positioned in such relation to the companion rollers 10 and 11 that the arms 15 will not oscillate sufficiently to close any of the contacts 16—17 when a sheet of the normal desired thickness throughout passes between the rollers 10 and 12 and 11 and 13. This mechanism is capable of measuring the thickness of sheets within one to two hundredths of a millimeter with the testing of paper of good quality.

A sheet which is defective because of being too thick or because of the presence of some foreign material therein will engage rollers 12 and 13, or either of them, sufficiently to overcome spring 19 and cause enough oscillation of at least one of contact arms 15 to close contacts 16—17. It will be understood, of course that the contacts 16—17 are all connected in parallel. This establishes a circuit through line 20, which energizes magnet 21 and attracts armature 22, causing the closing of contacts 23 and 24. Contacts 23 are included in a stick circuit through which current flows from line 25, through line 26, contacts 23, magnet 27, line 28, and normally closed contacts 29, to ground. Contacts 29 are mounted upon a lever 30 which is actuated by a pin 31, and the stick circuit will remain closed until the lever is rocked and contacts 29 are opened. Meanwhile contacts 16—17 will have opened through the action of springs 19 upon the passage of the defective sheet beyond the upper rollers.

Figure 4:
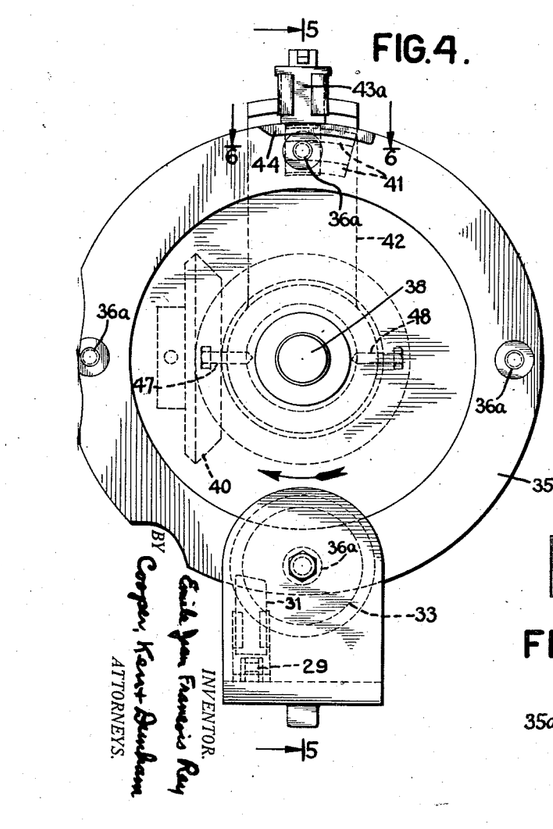
Fig. 4 is a front elevation of one of the four rotary relays illustrated in Fig. 1, and includes switch operating means of the first and fourth rotary relays.
Figures 5, 6:
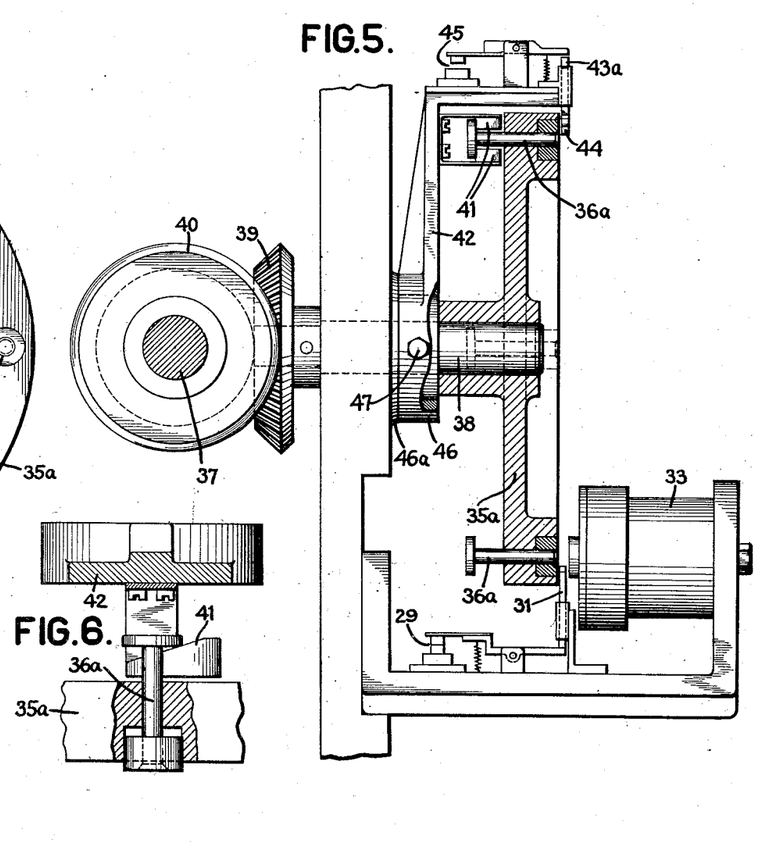
Fig. 5 is a sectional view on line 5—5 of Fig. 4.
Fig. 6 is a sectional view on line 6—6 of Fig. 4.

The energization of magnet 27 in the stick circuit causes current to flow from line 25, through line 26, contacts 24, line 32, magnet 33 to ground. This magnet operates to displace armatures in the form of plungers or pins mounted upon a rotating disk 35a which is part of a rotary relay (Figs. 4, 5 and 6). The rotation of disk 35a is synchronized with the passage of a sheet of paper through the machine, and the function of the rotary relay is to reset circuits to their normal conditions after the relay has been actuated to cause rejection of defective sheets after they have advanced to a predetermined station in the machine. The pins 36a are the armatures of the rotary relay and they are mounted in the disk 35a in such a manner that they may be displaced laterally by means of the magnet 33, Figs. 4, 5 and 6.

In the embodiment of the invention illustrated, there are four pins 36a equidistantly spaced about the circumference of the disk and the rotation of disk 35a is such that it will turn a quarter of a revolution for each sheet introduced into the machine. In addition to the left hand rotary relay in Fig. 1, there are three other rotary relays which are provided for purposes to be described hereinafter. For convenience the four rotary relays are driven from a common shaft which is geared in timed relation with the sheet-advancing rollers of the sorting machine.

As illustrated in Figs. 4, 5 and 6, the disk 35a of the rotary relay is mounted upon a shaft 38 which carries a bevel gear 39 in engagement with a bevel gear 40. As indicated hereinabove, bevel gear 40 is mounted upon a common shaft 37 which is driven in synchronism with the driving rollers and paper feeding mechanism of the machine.

When magnet 33 is energized, it causes one of the pins 36a to be displaced axially or extracted from its normal position, Fig. 5, so that as the disk 35a rotates clockwise the pin will strike pin 31 and displace it to cause the opening of the normally closed contacts 29.

The pin is retracted to its normal position by means of a cam 41 which is carried by an arm 42. Just before the pin reaches cam 41 it comes opposite pin 43a having a cam surface 44 by which the pin 43a is raised as the head of pin 36a passes by. Displacement of pin 43a closes the normally open contacts 45. Contacts 45 and their operating pin 43a also are mounted upon arm 42. This arm has a hub 46 by which it is supported upon a boss 46a secured to the stationary frame of the machine. Hub 46 is provided with a pair of set screws 47, 48 by which the arm may be fixedly positioned in any desired position of adjustment. The angular adjustability of arm 42 is to enable the placing of contacts 45 and their actuating pin 43a so as to time the operation of the compressed air to reject the defective sheets which have caused functioning of the rotary relay. The timing of the cycle of operation is referred to the forward or advance edges of the sheets of paper which pass through the machine, and as will be explained hereinafter, contacts 45 are so positioned as to cause deflection of the forward edge of a defective sheet from the path of travel of normal sheets when the defective sheet reaches station A, Fig. 2.

Referring again to the energization of magnet 33 because of the passage of a sheet faulty in thickness between rollers 10 and 12 and rollers 11 and 13, the energization of the magnet will cause the extraction of an armature pin 36a so as to project the head of the pin in the path of pin 31, and thereby cause the armature pin to open contacts 29. The opening of contacts 29 de-energizes the stick circuit and magnet 27 and causes the release of armature 22, thereby resetting the same to be ready for re-operation upon the passage of another defective sheet between rollers 10 and 12 and 11 and 13.

When the extracted pin 36a will have reached cam 44 and contacts 45 the defective sheet which caused the extraction of the pin will have advanced to station A, and when the extracted pin 36a strikes cam 44 it will cause the closing of contacts 45, with the result that current will flow from line 25, through line 52, contacts 45, line 53, magnet 54 to ground, Fig. 2. The energization of magnet 54 will actuate valve 55 and permit the passage of compressed air through openings 56 upon the lower side of a pipe 57 which extends across the machine.

Valve 55 is at station A and the opening of the valve is timed to divert the front edge of the defective sheet downwardly so that it will come between a pair of endless belts 58, 59 by which the defective sheet is directed to a receiver in which the sheets are collected. Compressed air is emitted from the openings 56 only so long as the extracted pin 36a remains in contact with the cam surface 44 which is made sufficiently long to assure the rejection of a defective sheet.

When the pin is retracted by the cam 41 the contacts 45 are opened under the action of their spring and this results in immediately de-energizing magnet 54, with the result that valve 55 closes and the emission of compressed air is concluded. Thereafter all normal sheets may pass beyond station A.

Figure 21:
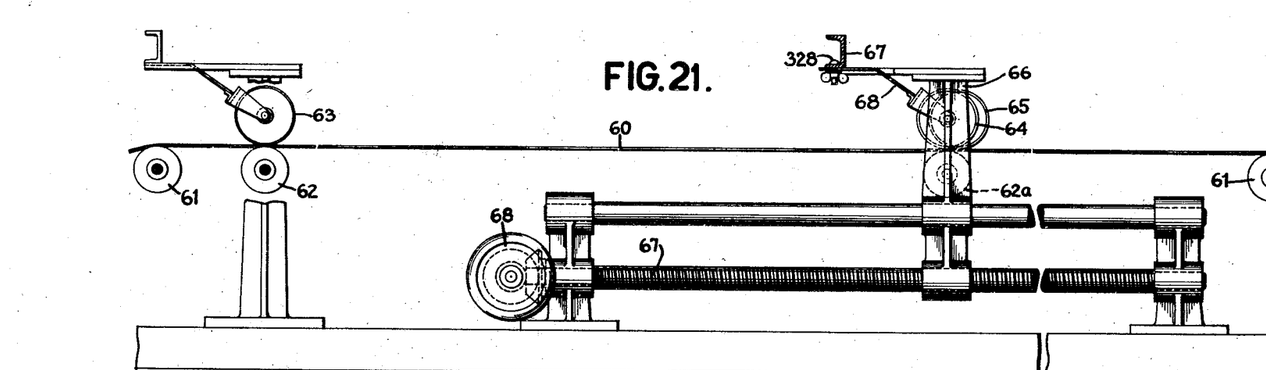
Fig. 21 is a side view of the rollers of the mechanism which determines which sheets are to be accepted or rejected on account of length.
Figure 22:
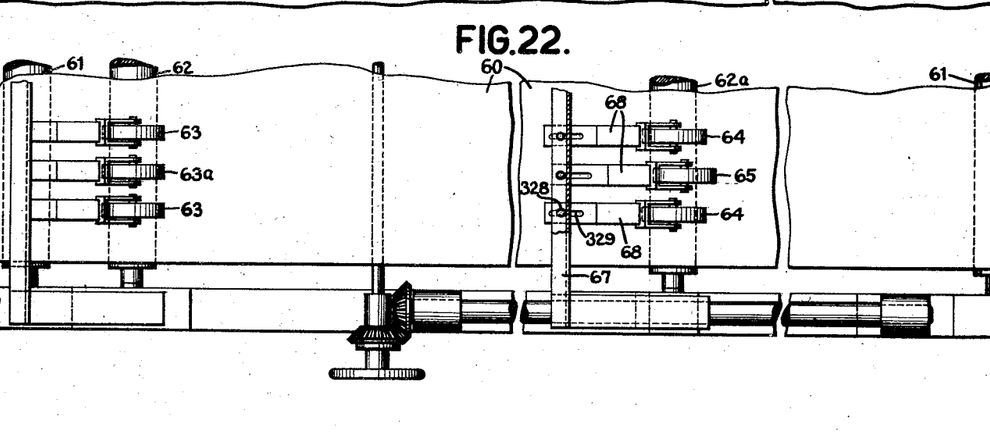
Fig. 22 is a plan of the mechanism illustrated in Fig. 21.

The sorting and rejecting of sheets which are either too long or too short is accomplished by devices capable of adjustment for different lengths of sheets and capable of ascertaining whether the sheets are of the desired lengths within any desired tolerance. Referring to Figs. 1, 21 and 22 this mechanism includes an endless wire screen 60 which is driven by driving rollers 61. Screen 60 carries the sheets and the first roller over which the sheet passes is roller 62, which is rotatably mounted in the frame of the machine at right angles to the path of travel of the sheets.

Two groups of rollers 63, 63a cooperate with the roller 62. The axes of the rollers of the group of rollers 63a are alined with the axes of the rollers of the group of rollers 63 (the two groups of rollers 63 and 63a being shown offset in Fig. 1 merely for clarity in illustration in the wiring diagram). The rollers of the group 63a alternate with the rollers of the group 63 in an axial direction, i. e. the rollers of group 63a are interposed or sandwiched between the rollers of group 63. The arrangement of the rollers may be understood from Figs. 22 and 21 in which a few of the rollers are shown.

The main frame of the machine also carries a set of rollers 62a spaced from rollers 62 a distance equal to the length of the sheets desired to be sorted. The distance between rollers 62a and 62 is adjustable to the desired length of the sheets.

Bearing upon screen 60 and above rollers 62a there are two groups of rollers 64, 65, so arranged that the rollers 64 of one group are just ahead of the rollers 65 of the other group (the separation being exaggerated in Fig. 1 for clarity in illustration), and the rollers of one group are alternately arranged with the rollers of the other group across the machine. The spacing, in the direction of travel of the sheets, between rollers 64 and 65 is equal to the permissible tolerance in length of the sheets to be accepted. This tolerance is adjustable as desired.

There are as many rollers 64 and 65 as there are rollers 63 and 63a and each roller 63 and 63a is electrically connected with a companion roller 64 or 65 and the rollers are normally grounded through travelling screen 60. For accommodating sheets narrower than the width of the moving screen, the rollers 63 and 63a, 64, and 65 extending beyond the longitudinal edges of the sheets are disconnected from the electrical circuit or temporarily removed from the machine so that only such rollers as may be contacted by sheets of the desired normal width will be operative to effect control of circuits about to be described.

Suitable provision is made for adjusting the distance between rollers 62 and 62a, for enabling the machine to handle sheets of different lengths. Referring to Figs. 21 and 22 it will be seen that roller 62a and rollers 64 and 65 are mounted upon a carriage 66 which is slidable parallel to the direction of travel of the sheets. Manipulation of screw 67 by hand wheel 68 effects displacement of the carriage.

The controlling circuits are operated as follows: When a sheet of normal length is carried along upon the screen 60, rollers 63 and 64 are raised together at the same time; this results in breaking the two contacts which rollers 63 and 64 normally make with the screen. Prior to the breaking of these two contacts current flows from line 25, through line 70, contacts 71, magnet 72, line 73, from which it is divided and flows through lines 74 and 75 to rollers 63 and 64, respectively, to screen 60 and to ground. The breaking of this circuit because of the presence of paper between rollers 63 and the screen, and between rollers 64 and the screen causes de-energizatoin of magnet 72 and the opening of contacts 76. Contacts 76 are normally closed and current normally flows from line 25, through line 70, armature 77, contacts 76, magnet 78 to ground, so that under normal conditions with magnet 72 energized, magnet 78 is energized and causes the extraction of pins 36b as they pass the magnet. Hence if sheets are not faulty because of being too short, magnet 78 will not extract any pin 36b passing by.

Figure 7:
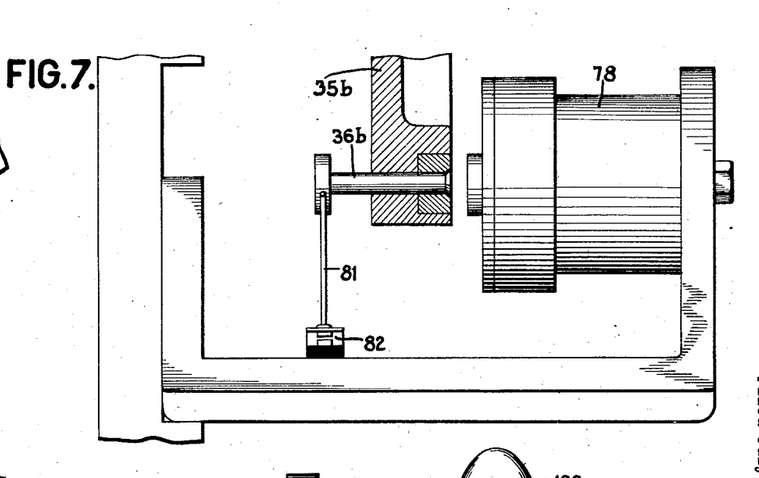
Fig. 7 illustrates the relation of a switch to its actuating pin as carried by the second rotary relay.

With contacts 76 open and magnet 78 de-energized, pin 36b is not extracted. Pin 36b is accordingly left in its retracted position, as shown in Fig. 7. In this position it will strike an arm 81 and cause the same to close contacts 82. The closing of contacts 82 causes current to flow from line 25 to line 70, magnet 83, contacts 82 to ground, thereby re-energizing magnet 83 and causing attraction of armature 77. This results in resettting the circuits and causing the re-energization of magnet 78 in time for the testing of a following sheet. The pin 36b being retracted does not engage pin 43b when the same comes opposite contacts 85 and consequently contacts 85 remain open. This being the case, the magnet 86 and valve 87 at station B, Fig. 2, are not operated to cause the emission of compressed air from openings 88 at the under side of pipe 89 so that a normal sheet which is not faulty because of being under length may pass beyond rolls 90, 91.

Figure 8:
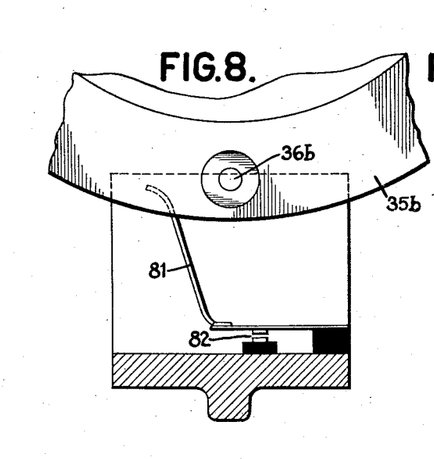
Fig. 8 is a front elevation of the switch illustrated in Fig. 7.

If a sheet carried upon metallic screen 60 is too short to simultaneously break both of the contacts between rollers 63 and the screen and roller 64 and the screen there will be no interruption of the normal current flow from line 25, through line 70, magnet 72, line 73, and through either line 74 or 75 (depending upon whether the sheet is beneath rollers 63 or rollers 64) with the result that contacts 76 remain closed and maintain magnet 78 energized. As pin 36b passes magnet 78 it is extracted by the attraction of the magnet and the rear end of the pin is drawn forward so that it does not strike arm 81 of contacts 82, Figs. 7 and 8. This is of no consequence in this particular operation, because armature 77 is already attracted and contacts 76 will remain closed under the influence of normally energized magnet 72.

When the extracted pin 36b has rotated to opposite contacts 85 it will strike pin 43b and cause the closing of contacts 85, thereby causing current to flow from line 25, through line 52, contacts 85, line 93, magnet 86 to ground. At this moment the forward edge of the short sheet will have arrived at station B and the actuation of the magnet 86 will cause the opening of valve 87 and the emission of compressed air through openings 88 in pipe 89. The defective sheet will be deflected downwardly before it reaches rollers 90, 91, and will come into engagement with the endless belts 95, 96. These belts deliver and collect the short sheets in a single compartment. The closing of the contacts 85 is temporary and the contacts will be immediately opened under spring action. After the pin 36b has passed contacts 85 it will be retracted by a cam similar to cam 41 and in the manner already described.

If the length of a sheet is greater than the normal length desired, it will cause the simultaneous breaking of contacts between rollers 63a and screen 60 and rollers 65 and screen 60. But when normal sheets pass, only one of the two contacts at rollers 63a and 64 is opened at one time, and current flows from line 25 through line 98, armature 110, contacts 99, magnet 100, line 101, either branch line 102 or branch line 103, through rollers 63a or 65, to screen 60 and ground. The opening of this circuit at rollers 63 and 65 at the same time causes the de-energization of magnet 100, the releasing of armature 110, and the closing of contacts 104. Closing of contacts 104 establishes a circuit from line 25, through line 98, armature 110, contacts 104, magnet 105, to ground, with the result that the magnet 105 extracts a passing pin 36c so that this pin may strike pin 43c to cause closing of contacts 106 and the rejection of the long sheet which caused the simultaneous breaking of contacts of the two groups of rollers 63a and 65 with screen 60.

Figure 9:
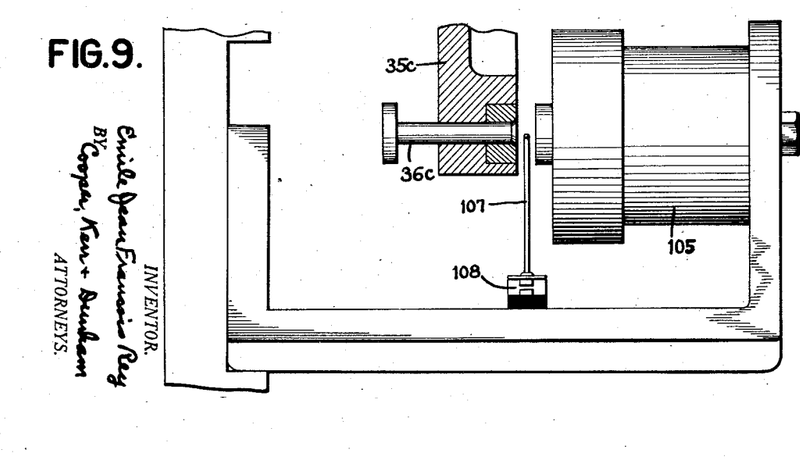
Fig. 9 illustrates the relation of a switch to its actuating pin as carried by the third rotary relay.
Figure 10:
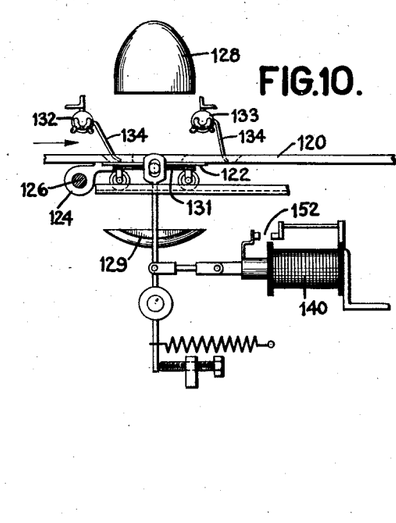
Fig. 10 is a detail of a shutter operating mechanism and shutter for shielding the photo electric cell by which defects in shade are detected.
Figure 11:
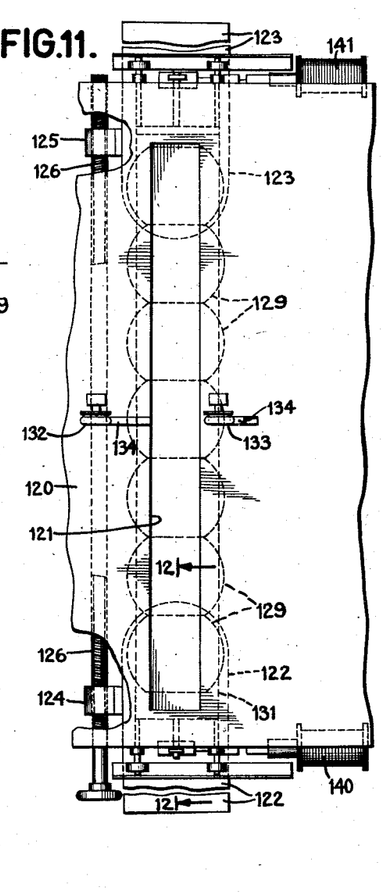
Fig. 11 is a plan showing the lateral slot, lenses and shutter of the mechanism by which defects in shade are detected.
Figures 12, 13, 14:
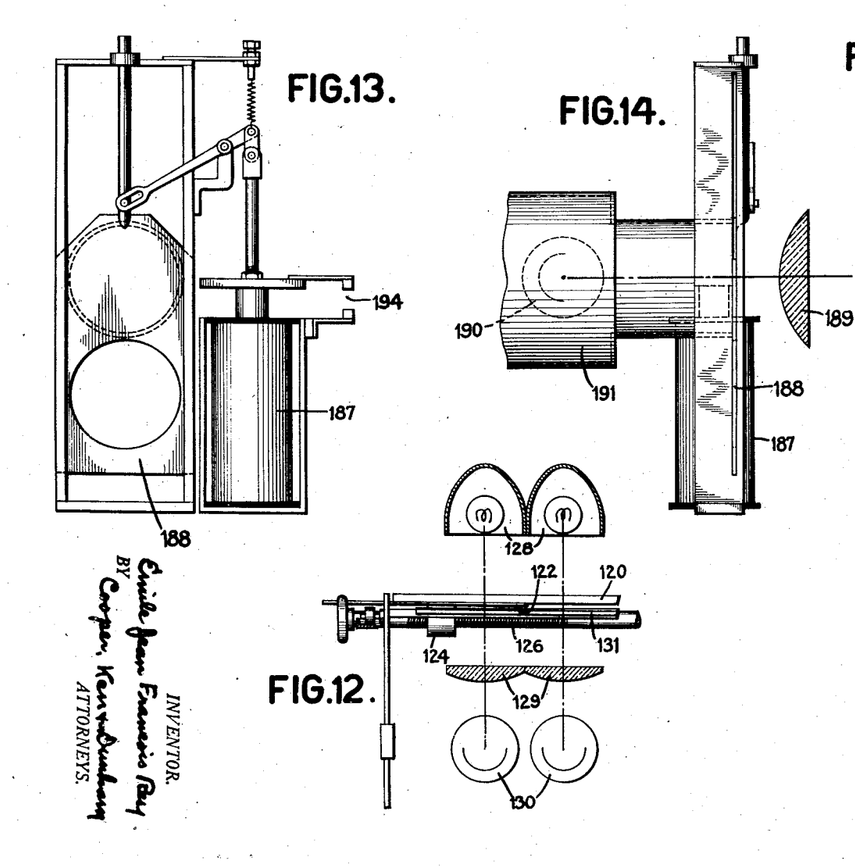
Fig. 12 is a partial sectional view through the shutter, lenses and light projecting and receiving devices by which defects in shade are detected.
Figs. 13 and 14 are details showing the magnet and shutter, by which light is controlled, for detecting defects due to color.

In order to establish normal conditions of the circuits to enable control by a following sheet, contacts 108 are provided with an arm 107 which is in the path of the head of the extracted pin 36c so that the contacts will be temporarily closed as the pin passes by, Fig. 9. This causes current to flow from line 25, through line 98, magnet 109, contacts 108 to ground, thereby resetting armature 110, closing contacts 99 and opening contacts 104. With magnet 105 de-energized, the revolving relay pins 36c will remain in retracted position until a following sheet appears which is sufficiently long to simultaneously break contacts which rollers 63a and 65 make with screen 60, to cause the release of armature 110. As in the other rotating relays, the pins 36c are retracted by a cam as they pass the contacts 106.

By the time contacts 106 are closed by an extracted pin 36c, the defective sheet which brought this about will have arrived at station C, Fig. 2. Upon the closing of contacts 106, a circuit is established from line 25, through line 52, contacts 106, line 112, magnet 113, to ground. Magnet 113 controls valve 114 and when the magnet is energized, compressed air is emitted from opening 115 in pipe 116 to cause downward deflection of the forward edge of the sheet previously determined to be overlength. The forward edge of the sheet is deflected downwardly before it reaches rolls 117, 118 and it is directed to a collector by means of an endless belt 119. As in the cases of valves 55 and 87, valve 114 is opened only sufficiently long to accomplish rejection of the defective sheet.

As I previously explained, if the sheet is of normal length, the normally excited circuit through line 73 will be broken and the normally excited circuit through line 101 will remain excited so that in this case the normal sheet will not be rejected at either station B or station C and will continue on through rollers 117 and 118 of the machine.

The sheet is then tested for the presence of any irregularities affecting opaqueness, such as blemishes, stains, creases, folds and spots, and for width. Upon leaving the rollers 117 and 118 the sheet passes upon a smooth surface such as may be provided by a hard table top 120, Figs. 2, 10, 11 and 12. This table top has a slot 121 transverse to the direction of movement of the sheet. Slot 121 is sufficiently long to extend beyond the edges of the widest sheet which the machine is built to handle, and the length of the slot may be varied by means of shields 122, 123 at each end of the slot. These shields are provided with nuts 124, 125 in engagement with a left and right hand screw 126 by which the shields may be brought closer together or separated to adjust the length of the slot to the width of the sheets being sorted and tested.

The opacity of the sheets and the presence of holes is determined by the intensities of light rays passing through the slot 121. The light rays affect a number of photo-electric cells which are connected in parallel and the combined intensity of the light striking the photo-electric cells determines the opacity of the sheets within a desired tolerance. The presence of any holes or creases and the presence of any blemishes or stains, or the presence of a sheet of paper which is too narrow to cover the entire length of slot 121, permits the passage of too much or too little light to the photo-electric cells, with the result that circuits are placed into operation which cause the rejection of the defective sheets. Just above the slot 121 there is a row of projectors 128, and beneath the slot there is a row of lenses 129 and a row of photo-electric cells 130. Under normal conditions when there is no sheet passing over the slot there is interposed between the projectors and the photo-electric cells a shutter 131 which prevents light from reaching the photo-electric cells. The whole device is placed under a hood so as to operate as much as possible in darkness. The following mechanism is provided for displacing the shutter when a sheet covers the slot during its passage through the machine. Upon each side of the slot there is a mercury contact member 132, 133, each having an arm 134 extending into the path of the moving sheets. With no sheet present the contact members are in circuit and current flows from line 25, through line 135, magnet 136, line 137 and through contact members 132 and 133 to ground. In this condition magnet 136 is energized and contacts 138 are open. Preferably, the arms 134 of contact members 132 and 133 are placed as close to the slot 121 as is practical. When a sheet covers the slot 121 and extends beneath both contact members 132 and 133, line 137 is opened and magnet 136 is de-energized with the result that armature 139 is released and contacts 138 are closed. The closing of contacts 138 establishes a circuit from line 25, through line 135, contacts 138, a pair of shutter operating magnets 140, 141, to ground. The energization of magnets 140, 141 and the attraction of their corresponding armature effects the displacement of shutter 131 from its normal position and permits the passage of light from the projectors to the photo-electric cells 130.

The immediate result of the passage of light through the paper causes the milliampere sensitive relay 146 to be affected in accordance with the intensity of the light striking the photoelectric cells. In the event that the sheet being tested is normal, the needle 147 of the sensitive relay will assume the position previously determined for the degree of opacity desired in a normal sheet, or will be deflected because of excessive light or insufficient light. If the defect is of such a nature as to warrant the rejection of the sheet being tested, the needle will be deflected sufficiently to close either of the contacts 148 or 149, thereby closing a circuit which causes flow of current from line 25, through line 135, line 143, magnet 150, contacts 148 or 149, needle 147, line 151 and contacts 152, which have been previously closed by the energization of magnet 140, to ground. The spacing of contacts 148 and 149 determines the permissible tolerance in the quality of opaqueness.

The energization of magnet 150 attracts armature 153 and closes contacts 154 so that a stick circuit is established from line 25, through line 135, line 143, contacts 154, magnet 155, line 156, and the normally closed contacts 157 to ground. The stick circuit will remain closed until contacts 157 are opened by the action of a pin 36d. The actuation of armature 153 also results in closing contacts 159 and the establishing of a circuit from line 25, through line 135, line 143, contacts 159, line 160, magnet 161 to ground, thereby causing the extraction of a pin 36d as it comes to a position opposite magnet 161. After the pin has been extracted it comes into contact with rod 162 and operates the same to open contacts 157, thereby opening the stick circuit 156 and de-energizing magnet 155. This releases the armature of magnet 155 which returns to its normal position where it remains until another defective sheet comes over slot 121.

When the extracted pin 36d passes pin 43d it actuates the same and causes contacts 163 to close, thereby establishing a circuit from line 25, through line 52, contacts 163, line 164, magnet 165, normally closed contacts 166 to ground. This occurs when the sheet determined to be defective on account of holes, improper opaqueness, or on account of being too narrow, reaches the approximate position of gate 167. Under the influence of magnet 165 gate 167 opens in time to deflect the forward edge of the defective sheet into the chute 168. Contact member 166 is so located that a sheet entering chute 168 will have passed the gate before the forward edge of the sheet will have contacted with arm 169 of the contact member to break contacts 166. The length of the cam surface on pin 43d of the fourth rotary relay must be such as to maintain contacts 163 closed and magnet 165 energized long enough to permit the sheet descending through chute 168 to have cleared gate 167 before its forward edge strikes arm 169 of contacts 166. If desirable a stick circuit for magnet 165 may be provided.

It will be understood from the foregoing that when a normal sheet passes over table 120 and no defect in the quality of opaqueness is found therein, the milliampere sensitive relay 146 will not be affected to the extent necessary to actuate relay 150, and contacts 159 will not be closed so that gate 167 will not be displaced from its normal position, and the tested sheet will continue on through the machine.

The sheets are next tested for color and shade, and for this purpose the following mechanism is provided. After a sheet has passed through rollers 175, its front edge comes into contact with an arm 176 of contact member 177. Contacts 177 are normally closed and current flows from line 25, through line 135, magnet 178, line 179, through branch lines 180 and 181 and through contacts 177 and 182, respectively, to ground. Upon the opening of both contacts 177 and 182 by a moving sheet, magnet 178 will be de-energized and contacts 183 will be closed, thereby setting up a circuit from line 25, through line 135, contacts 183, line 186, magnet 187, to ground, Figs. 2, 13 and 14. The energization of magnet 187 displaces shutter 188 from between lens 189 and photoelectric cell 190. This device is contained within a housing 191.

The ray of light by which the sheet is tested for shade and color is emitted from projector 192 and passes through lenses 193 to the surface of the sheet of paper from where it is deflected and directed through lens 189 to the photo-electric cell 190 when shutter 188 has been displaced. Upon displacement of shutter 188 contacts 194 close. These are connected with one side of milliampere sensitive relay 196 which is under the influence of photo-electric cell 190.

If the shade of a paper is normal the needle 195 of the sensitive relay 196 will not be displaced sufficiently to cause the relay to operate controlling circuits, but if the sheet is lighter or darker than the shade desired, needle 195 will come against one or the other of contacts 197, 198, and will establish a circuit from line 25, through line 199, magnet 200, either contact 197 or 198, needle 195, line 201, contacts 194, to ground. This results in actuating armature 202 and in closing contacts 203, thereby establishing a stick circuit from line 25, through line 199, contacts 203, magnet 204, line 205, contacts 166, to ground. Contacts 207 are also closed upon the actuation of the armature 202 and a circuit is established from line 25, through line 199, contacts 207, line 208, magnet 165, and contacts 166 to ground. The energization of magnet 165 opens gate 167 and permits the oncoming sheet to enter chute 168. Magnet 165 will remain energized so long as contacts 203 and contacts 166 are closed. Upon the opening of contacts 166 by the forward edge of the rejected sheet of paper, magnet 204 and magnet 165 are de-energized. This permits the return of the gate 167 to its normal closed position. Upon de-energization of magnet 204, armature 202 returns to normal position and contacts 203 and contacts 207 are opened.

The normal sheets of paper which pass beyond gate 167 are delivered to a pair of rollers 215, Fig. 2. These rollers are driven at a constant speed by some such means as a synchronous motor 216. A constant speed motor is provided in order to insure that all the sheets delivered from the rollers 215 will be given the same velocity. The driven sheets descend upon the incline 216a and are thrown against a set of hooks 217, Figs. 3, 15 and 17. These hooks are carried upon a weighing device comprising a light frame having a pair of aluminum bars 218, 219 extending transverse of the machine and supporting hooks 217 in the path of the advance edge of the oncoming sheet. This frame is supported upon bearings 220 and the arrangement is such that the impact of the oncoming sheet will cause the frame to be pivoted upon its bearings an amount proportional to the weight of the sheet.

The frame is provided with an indicator 221 which is adapted to contact switch operating elements 222 and 223 disposed in the path of movement of the indicator. The frame, indicator and hooks are counterbalanced by means of a weight 224 and the positions of the contacts operating elements 222 and 223 are such as to effect control of circuits for accepting sheets of normal weight and for rejecting sheets which are either too light or too heavy.

The weighing apparatus must first be adjusted in order to take proper weight measurements of the sheets passing through the machine. The distance of the rollers 215 from the hooks 217 should be just a little greater than the length of the sheets being tested. The rollers 215 and motor are so mounted upon frame members 227 as to enable the positioning of the rollers at the desired distance from the hooks 217. The frame members are engaged by screws 228 and a cross shaft is geared to the two screws. The cross shaft has a hand-wheel 229 for operating the screws for moving the frame members and rollers.

The incline 216a is provided with guide rails 232, one at either side of the incline. These guide rails are adjustable laterally in accordance with the width of the sheets of paper.

Since the velocity of the oncoming sheets is maintained constant, the deflections of the hooks 217 and of indicator 221 will be in proportion to the relative weights of the sheets. The sheets are thrown against the hooks 217 of the balance and the deviations of the indicator may be noted. In adjusting the weighing apparatus the switch operating arm 222 must be so placed that it will always be actuated by the indicator 221 when a sheet of normal weight strikes the hooks 217, and the switch operating arm 223 must be so positioned as to be actuated by the indicator 221 only when sheets of too great weight strike the hooks 217. The counterweight 224 is positioned upon its supporting rod for the purpose of obtaining the proper regulation of the weighing apparatus. The general regulation of this apparatus can be completed by noting the swing of the indicator during a trial made with sheets which have previously been weighed.

Testing for weight is accomplished in the following manner. When a sheet strikes the hooks 217, the indicator 221 is displaced from its normal position, thereby permitting switch 236 to open under the influence of its spring 235. The opening of switch 236 opens the circuit including the normally energized magnet 237, Fig. 3, which releases armature 238. Armature 238 carries contacts 239 which engage contacts 240 after the lapse of a period of time dependent upon the adjustment of dash-pot 241. Prior to the closing of contacts 239, 240, the indicator 221 will have actuated the switch operating arm 222 for switch 243, if the sheet weighed exceeds the required minimum weight. This will have resulted in opening the circuit through relay 244 which is normally energized because of current flowing from line 25, through contacts 245, magnet 244, line 246, switch 243, to ground. Upon opening of contacts 243, armature 268 of relay 244 is released and contacts 246a are opened thereby de-energizing the circuit including line 249 and magnet 250. This results in closing valve 251 so as to cut off the emission of compressed air from pipe 252 so that the sheet of normal weight which has brought this condition about may pass on beyond the pipe.

The dash-pot 241 delays the closing of contacts 239—240 for a sufficient period of time to enable the indicator 221 and hooks 217 to complete their swing. The closing of contacts 239—240 establishes a circuit from line 25, through contacts 239—240, magnet 254 to ground, thereby attracting armature 255 and closing contacts 256. The closing of contacts 256 establishes a circuit from line 25, through contacts 256, line 257, magnet 258 and ground. Magnet 258 operates upon an arm 259 connected to a pivoted frame 260 which carries fiber rolls 261 disposed between hooks 217 of the weighing mechanism. The rollers, when actuated by magnet 258, lift the forward edge of a sheet of paper so as to release it from the hooks, and directs it towards the endless belts 262.

The endless belts 262 carry a sheet to the endless belts 263 if the sheet is of the desired weight because in that case the flow of compressed air from pipe 252 will have been discontinued, as already explained.

If the sheet is underweight so that the indicator will not have actuated the switch actuating arm 222, switch 243 will have remained closed and the compressed air issuing from pipe 252 will not have been shut off. In that case the compressed air would reject a sheet and cause the same to be deflected to a conveyor 264.

A sheet which is not underweight will have caused the discontinuance of the flow of compressed air from pipe 252, as just explained, and the sheet will be carried upwardly between endless belts 263. An arm 266 of switch 265 is so positioned as to be actuated by a sheet being carried between belts 263 to establish a circuit from line 25, through magnet 267, switch 265 and ground. This causes actuation of armature 268 and resets the relay with contacts 245 and contacts 246a closed, thereby actuating magnet 250 and valve 251 to again turn on the flow of compressed air from pipe 252. So far as valve 251 is concerned it is ready to be controlled by a following sheet.

When the indicator 221 returns to its normal position it will cause the closing of switch 236, with the result that magnet 237 will attract armature 238 and open contacts 239—240. This causes de-energization of magnet 254 and the opening of contacts 256, with the result that magnet 258 is also de-energized and the fiber rollers 261 are permitted to drop to normal position.

It will be recalled that the switch operating arm 223 is so positioned in the path of travel of the indicator 221 that the arm 223 will be actuated whenever sheets of too great weight strike the hooks 217. Switch 270 is normally open and when the indicator 221 has swung sufficiently far to strike arm 223, switch 270 will be closed, therby causing energization of magnet 271. This results in closing the stick circuit from line 25, through contacts 272, magnet 273, switch 274 to ground. At the same time, contacts 275 are closed, so that when the sheet of paper arrives opposite normally open switch 276 it will cause the closing thereof by striking against the switch arm 277, and a circuit will be established from line 25, through contacts 275, switch 276, magnet 278 and ground. Magnet 278 opens valve 279 which causes the issuance of compressed air from pipe 280.

Compressed air deflects the overweight sheet so that it may not enter between the endless belts 281. The overweight sheet falls upon an incline 282 and when the same strikes the operating arm 283 of switch 274 the stick circuit of magnet 273 is opened, thereby releasing the armature and causing the opening of contacts 275 and the closing of the compressed air valve 279. This resets the circuits so that a normal sheet may pass the compressed air pipe 280 and enter between the endless belts 281. Switch 270 is such that it will be closed only long enough to initially establish the stick circuit through magnet 273.

From the foregoing it will be understood that a sheet which is to be rejected because of being too light will not cause the opening of switch 243, and that if a sheet is of normal weight or overweight, circuits which are under the control of switch 243, are brought into action, with the result that the flow of compressed air from pipe 252 is discontinued, and that if the sheets are overweight, switch 270 will be closed, with the result that the overweight sheet will be rejected by a blast of compressed air from pipe 280.

The sheets which have passed through the machine leave the belts 281 and are deflected between rollers 285, 286. Roller 286 is a metallic roller and is grounded. Roller 285 is insulated and has a slip-ring which continuously engages contact 287 so that when no paper is present between the two rollers, current flows from line 25, through magnet 288, contacts 287, the slip-ring on roller 285, roller 286, to ground. When the circuit is broken by the passage of a sheet of paper between rollers 285 and 286, the normally energized magnet 288 is de-energized and counter 289 is actuated. The counter may be of any usual type by which the total number of sheets passing through the machine may be kept track of. A relay may be provided to stop the machine, or to deliver from the discharge station a predetermined number of sheets; when the counter has counted a predetermined number of sheets, say five hundred.

It is to be understood that the various relays and switches are such as to be sensitive enough to cause immediate energization or de-energization of the various circuits. Several of the switches have been illustrated as mercury cup switches and this type is satisfactory, although I desire it to be understood that any switches which are sufficiently sensitive and which may be easily adjusted, may be used. The switches, relays, contacts and other electrical apparatus are shown merely in an illustrative manner.

Figures 15, 16, 17, 18:
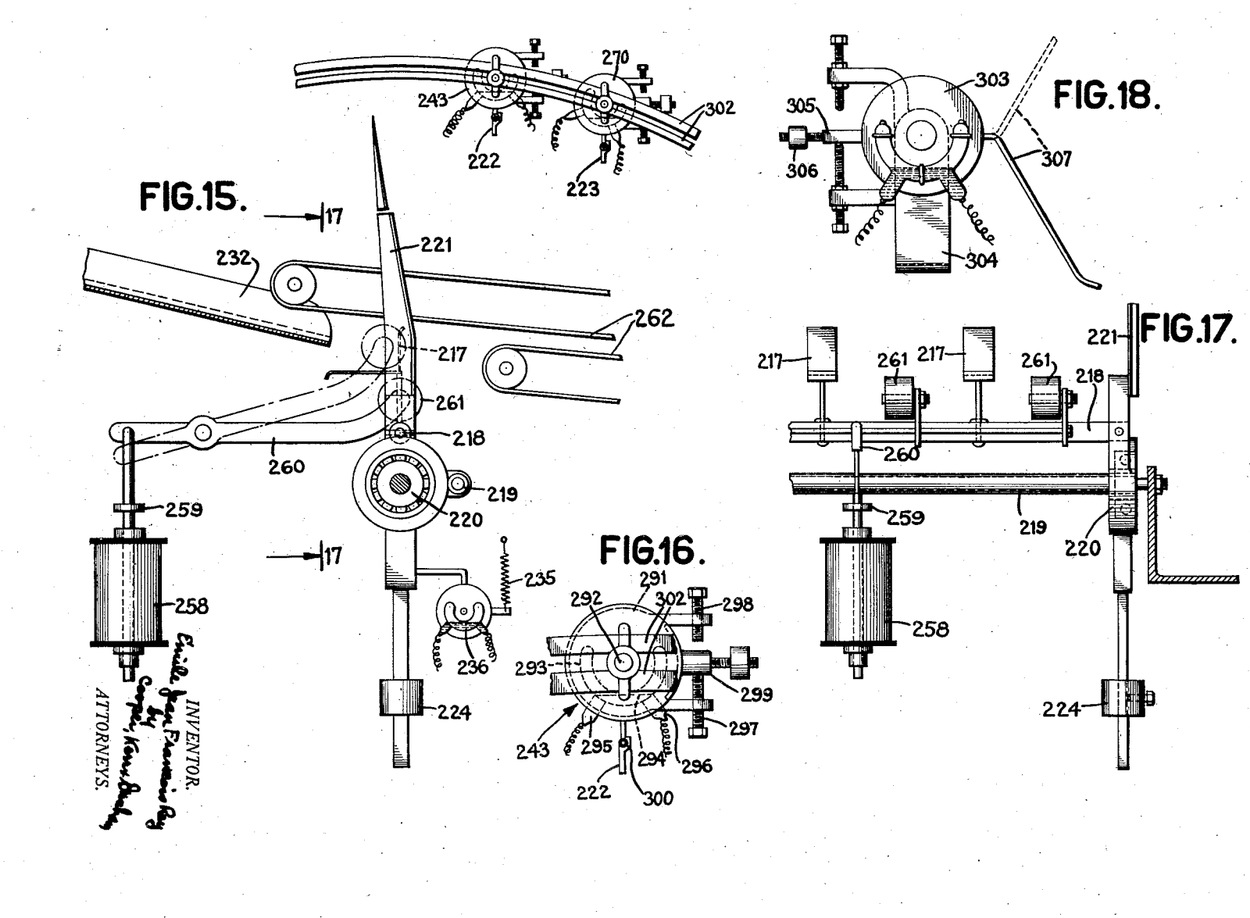
Fig. 15 is an enlarged view of the weighing mechanism and switches controlled thereby.
Fig. 16 is an enlarged view of one of the mercury switches which is actuated by the pointer of the weighing mechanism.
Fig. 17 is an elevation on line 17—17 of Fig. 15.
Fig. 18 is a detail of a mercury switch.

In Fig. 16 I have shown an enlarged detail of switch 243, Fig. 15. This switch is of a common type in which mercury is used in making and breaking contacts and which consists principally of a cylinder 291 mounted for oscillation upon a bearing 292. The cylinder has an arcuate chamber 293 which contains mercury 294 at a level enabling the bridging of terminals 295 and 296. As illustrated in Fig. 16 the mercury bridges the gap between contacts 295 and 296. When the cylinder is displaced upon its axis by the indicator 221, Fig. 15, terminal 296 is raised above the level of the mercury 294 with the result that the electrical connection between the two terminals is broken. The limit of oscillation of the cylinder 291 is determined by a pair of set screws 297, 298 which engage a lug 299 carried by the cylinder.

Referring to Fig. 15, for the normal setting of switch 243 the set screws 297, 298 are so adjusted that the gap between the terminals 295 and 296 is bridged by the mercury, and for the normal setting of switch 270 the setting of the set screws 297, 298 is such that the mercury does not bridge the gap between the two terminals, as has been previously explained. Switch 243 and switch 270 are provided with arms 222 and 223 respectively by which they are displaced from normal position when contacted by indicator 221. Each of these arms 222 and 223 is provided with a one-way hinge 300, Fig. 16, which will permit the return of indicator 221 to its normal position without rocking the switches 243 and 270. The hinges permit the ends of arms 222, 223 to swing to the left, Fig. 15, relative to switches, but they do not permit pivoting of the ends of the arms 222 and 223 relative to the switches when the indicator 221 comes in contact therewith when moving toward the right, Fig. 15.

The bearings of the switches 243 and 270 are supported by a rail 302 which is arcuate in respect to the axis of oscillation of the indicator 221. This rail enables the positioning and spacing of the switches 243 and 270 to bring about sorting according to the desired weight.

In Fig. 18 I have illustrated a form of mercury contact switch which is suitable for controlling various circuits. The switch is similar to that illustrated in Fig. 16, and ncludes a cylinder 303 rotatably mounted upon bearings which are supported by member 304. The cylinder carries a lug 305 by which the limits of oscillation of the cylinder may be determined. An adjustable nut 306 is provided for adjusting the sensitivity of this contact member. Wire 307 may be bent in any direction in which it is desired to extend the same in order to reach into the path of a moving sheet.

Figure 19:
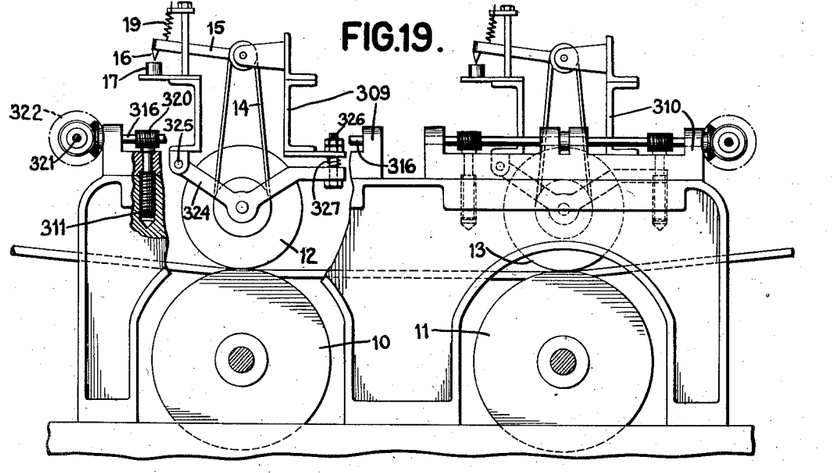
Fig. 19 is a side view of the thickness measuring mechanism illustrated at the left of Fig. 1.
Figure 20:
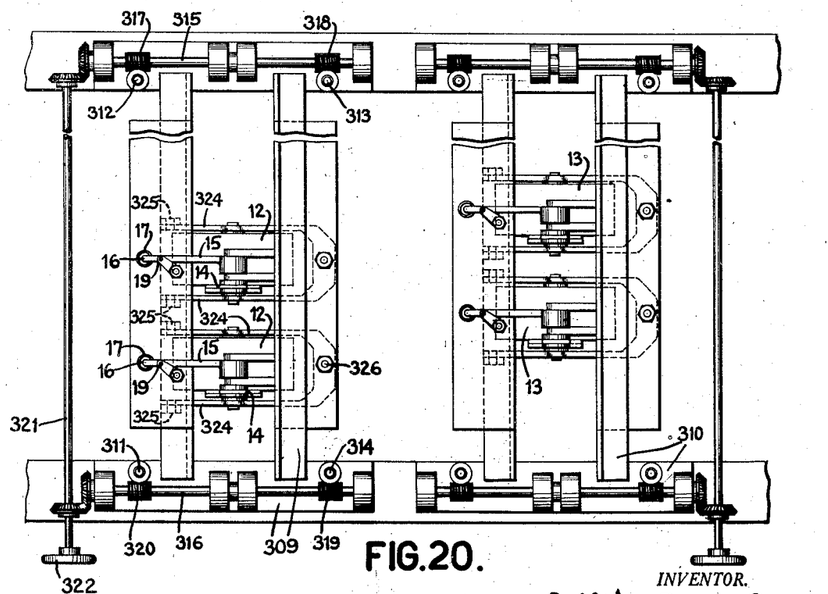
Fig. 20 is a plan of the mechanism illustrated in Fig. 19.

In Figs. 19 and 20 I have illustrated enlarged views of the thickness measuring mechanism which the sheets come into contact with when they first enter the machine. The operation of this mechanism has been explained in connection with the showing of the same in Fig. 1. The rollers 10 and 11 are mounted in the main frame of the machine. The group of rollers 12 and 13 are carried in auxiliary frames 309 and 310, respectively. These frames are so mounted upon the main frame that they may be raised or lowered individually to control the spacing between the rollers 12 and roller 10, and between the rollers 13 and roller 11.

Both of the auxiliary frames are alike and are adjusted in the same manner so that an understanding of the construction of one will suffice. Each frame is supported by four elevating screws 311, 312, 313, 314, Fig. 20, which are in threaded engagement with tapped holes in the main frame, in the manner illustrated at 311, Fig. 19. The auxiliary frame carries a pair of shafts 315, 316, which have worms 317, 318, 319 and 320 engaging companion worms upon elevating screws 311, 312, 313 and 314, so that when the shafts 315 and 316 are rotated the elevating screws will cause the raising or lowering of the auxiliary frame. The shafts 315 and 316 are geared to a cross shaft 321 which has a hand wheel 322 by which the same may be rotated. It is apparent that depending upon the direction of rotation of hand wheel 322 the auxiliary frame and rollers supported thereby may be raised or lowered to the desired adjustment.

Each roller of the two groups of rollers 12 and 13 is individually supported in its auxiliary frame by a pair of members 324 which are pivoted at 325. The other ends of members 324 are supported by bolts 326 and spring 327. The bolts and the springs permit individual adjustment of the tension in belts 14.

In Figs. 21 and 22 I have shown a manner of mounting rollers 64 and 65 upon a carriage 66 whereby they may be positioned in accordance with the length of the sheets desired. Carriage 66 includes a channel iron 67 to which the roller supporting members 68 are secured. Some such means as a slot and pin connection may be provided for enabling individual adjustment of the rollers 64 and 65. Each pin and slot connection includes a bolt 328 and a slot 329 whereby the spacing between rollers 64 and 65 may be adjusted to any desired tolerance.

According to the present invention provision is made for feeding sheets in succession from a supply stack at a supply station to a discharge stack for normal or standard sheets at a discharge station. Intermediate said stations, provision is made for testing and rejecting sheets which vary from a requisite standard. Each sheet, while it is in motion, will be tested for thickness, thereafter for under-length and/or overlength, then for visual characteristics such as blemishes, holes, creases, crumpling, tearing, stains or for narrowness of width and for color. Color testing is effected separately but sheets rejected for color variation go to the same reject station which receives reject sheets rejected for other visual characteristics. Finally there is testing and rejection of sheets for overweight and/or under-weight. Sheets which pass all of the tests pass through the entire machine and are counted and delivered to the discharge stack for standard sheets. All testing and rejecting and diverting is effected with the sheets in motion and certain testing operations are performed concurrently upon different sheets. The testing is effected successively and reject stations are provided for sheets which vary from standard thickness; for length two stations are provided for receiving respectively short and long sheets; a single reject station is provided for sheets which are visually tested; and two reject stations are provided to receive respectively under-weight and over-weight sheets. While a common reject could be provided for all non-standard sheets the separate stations are of particular utility in segregating the defects. For example, sheets which are too short can be reclaimed for a shorter standard length, likewise over-weight and under-weight sheets may be of themselves saleable in different weight classifications.

What is claimed is:

1. In a machine for sorting sheets of paper or the like, the combination comprising driving rollers for advancing sheets through the machine, rollers cooperating with certain of said driving rollers for testing the thickness of the sheets, said rollers being disposed across the entire width of the sheets being tested, circuits operated by said last named rollers for causing the rejection of sheets having defects causing excessive thickness, a screen passing over certain of said driving rollers, rollers cooperating with said screen for determining whether the sheets carried by said screen shall be rejected because of length, means for rejecting the sheets having lengths outside of the tolerance allowed by said length-testing rollers, circuits under the control of said length-testing rollers for controlling the operation of said rejecting means, means for determining whether the sheet is of the desired opaqueness, means controlled by said last named means for rejecting sheets defective on account of opaqueness, means for determining the color and shade of a sheet, means controlled by said last named means for rejecting sheets having undesired color and shade, means for weighing the sheets as they advance through the machine, means for rejecting overweight and under-weight sheets, and means for collecting the normal sheets which have successfully passed through the various tests.

2. In a machine for sorting sheets of paper or the like, the combination comprising driving rollers for advancing the sheets, means for testing the thickness of sheets passing through the machine, said means including a multiplicity of sensing rollers in spaced relation to the driving rollers and collectively arranged to sense the entire width of a passing sheet, and circuits controlled by the rotation of any one of said sensing rollers for causing the rejection of sheets defective on account of excessive thickness.

3. In a machine for sorting sheets of paper or the like, the combination comprising driving rollers, a metallic screen driven by said driving rollers and advancing sheets in the machine, means for determining whether a sheet upon the screen is of desired length, said means including circuit-controlling contact means making electrical contact with the screen and adapted to be insulated therefrom by the presence of paper on the screen, means for rejecting sheets having lengths outside of the permissible tolerance, circuits controlled by said contact means for causing said rejecting means to reject from the machine all sheets which do not measure within the length and tolerance permitted.

4. In a machine for sorting sheets of paper or the like, the combination comprising driving rollers, a metallic screen driven by said rollers, two groups of aligned rollers normally engaging the screen, two other groups of rollers normally in engagement with the screen and spaced from said first named groups of rollers a distance approximating the length of sheets desired, means for rejecting sheets outside of the length and tolerance permitted and outside of the lengths determined by said groups of rollers, and circuits controlled by the making and breaking of contact between said groups of rollers and metallic screen for controlling the operation of said rejecting means.

5. In a machine for sorting sheets of paper or the like, the combination comprising driving rollers, a metallic screen driven by said rollers and advancing sheets in a machine, a group of rollers normally engaging with said screen for the width of the sheets being tested, another group of rollers spaced from said first named group of rollers a distance corresponding to the minimum length of sheet desired and normally contacting with said screen, circuits normally established through said two groups of rollers and the screen, rejecting means controlled by said circuits, and relays in said circuits for causing the actuation of said rejecting means when a sheet of paper passes beneath said two groups of rollers which is of insufficient length to break the circuit between the two groups of rollers and the screen.

6. In a machine for sorting sheets of papers or the like, the combination comprising driving rollers for advancing sheets through the machine, a metallic screen driven thereby, groups of rollers normally in contact with said screen and spaced from each other a distance corresponding to the maximum permissible length of sheets, circuits including said groups of rollers for energizing means for rejecting oversize sheets, relays operable whenever a sheet passes said rollers which is sufficiently long to simultaneously break the contact between both groups of rollers and the screen, and means for rejecting sheets which are sufficiently long to cause the simultaneous breaking of the contacts between the rollers and the screen.

7. In a machine for sorting sheets of paper or the like, the combination comprising means for weighing sheets of paper in transit through the machine, means for imparting to said sheets of paper a constant velocity and for directing said sheets of paper against said weighing means, means normally operative to cause the rejection of underweight sheets, and circuits controlling relays to interrupt the operation of said rejecting means to permit passage of sheets through the machine which are determined by said weighing means to exceed the minimum weight.

8. The combination set forth in claim 7 in which means are provided to cause the rejection of sheets exceeding the maximum desired weight and in which is provided circuits controlling relays to operate said rejecting means upon the actuation of said weighing means by a sheet exceeding the maximum desired weight.

9. In a machine for sorting sheets of paper or the like, the combination comprising means for weighing sheets of paper in transit through the machine, means for imparting to said sheets a constant velocity and for directing said sheets against said weighing means, means under the control of the weighing means to cause the rejection of sheets which do not come within the range of weight desired, and circuit controlling means for releasing a weighed sheet from the weighing means upon the conclusion of the weighing operation.

10. In a machine for sorting sheets of paper or the like, in combination, means for moving a succession of sheets through the machine and means for discharging at a discharge station only those of said sheets which have a predetermined standard density uniformly throughout each sheet, said last-mentioned means including devices for testing the sheets of paper for thickness and opacity at every point on each sheet, for length at any point across the entire width of the sheet, and for weight, and means under the control of said devices for diverting sheets which are found by said devices to be non-standard as to thickness, length, opacity or weight, to prevent their discharge at the discharge station.

11. In a machine for sorting sheets of paper or the like, in combination, means for moving a succession of sheets through the machine and means for discharging at a discharge station only those of said sheets which have a predetermined standard density and light-modifying character uniformly throughout each sheet, said last-mentioned means including devices for testing the sheets of paper for thickness and opacity at every point on each sheet, and for length, shade and weight, and means under the control of said devices for diverting sheets which are non-standard as to thickness, length, opacity, shade or weight, to prevent their discharge at the discharge station.

12. In a machine for sorting sheets of paper or the like, in combination, means for testing the thickness of sheets at every point on each sheet, means for testing the length of each sheet, electromagnetically controlled devices for deflecting non-standard sheets, means for advancing successive sheets of paper through both said testing means in succession and normally thereafter past the deflecting devices to a discharge station, electromagnetically settable relay devices timed with the sheet advancing means for effecting delayed closing of circuits to the deflecting devices when a sheet is advanced to the latter, circuits controlled by the thickness-testing means for setting a relay device in response to non-standard thickness at any point on the sheet, and circuits controlled by the length-testing means for setting other relay devices respectively in response to sheets shorter or longer than standard length, whereby the deflecting devices are operated to deflect sheets non-standard in thickness or length only when said sheets are advanced to said devices.

13. In a machine for sorting sheets of paper or the like, in combination, means for moving a succession of sheets through the machine and means for discharging at a standard sheet discharge station only those of the said sheets which have standard characteristics, said characteristics including a uniformly even and unblemished surface, said last-mentioned means including a device for testing the moving sheets of paper for thickness at every point on each tested sheet to detect uneven spots and blemishes thicker than the standard sheet thickness, a device for testing the moving sheets of paper for opacity at every point on each tested sheet to detect uneven spots and blemishes which differ in opacity from the standard sheet opacity, and means under the control of said devices for diverting sheets found to be non-standard in thickness or opacity, to prevent their discharge at the discharge station.

14. In a machine for sorting sheets of paper or the like, in combination, means for moving a succession of sheets through the machine, and means for discharging at a standard sheet discharge station only those of the said sheets which have a standard average density intermediate their surfaces, said last mentioned means including a device for testing the moving sheets of paper for thickness at every point on each tested sheet, a device for testing the moving sheets of paper for weight, and means under the control of said devices for diverting sheets found to be non-standard in thickness or weight, to prevent their discharge at the discharge station, said weight testing device comprising means directly responsive to the momentum of a moving sheet and means for delivering successive sheets to said momentum-responsive means with a predetermined uniform velocity.

15. In a machine for sorting sheets of paper or the like, in combination, means for moving a succession of sheets through the machine, and means for discharging at a standard sheet discharge station only those of the said sheets which have a standard average weight per unit of length intermediate their ends, said last mentioned means including a device for testing the moving sheets of paper for length to detect sheets longer or shorter than the standard sheet length, a device for testing the moving sheets of paper for weight, and means under the control of said devices for diverting sheets found to be non-standard in length or weight, to prevent their discharge at the discharge station, said weight-testing device comprising means directly responsive to the momentum of a moving sheet and means for delivering sheets of standard length to said momentum-responsive means with a predetermined uniform velocity.

16. In a machine for sorting sheets of paper or the like, in combination, means for moving a succession of sheets through the machine, and means for discharging at a standard sheet discharge station only those of said sheets which are of standard weight uniformly distributed at every point on each sheet, said last mentioned means including a device for testing the moving sheets of paper for opacity at every point on each tested sheet, a device for testing the moving sheets of paper for weight to detect sheets having a total weight differing from the standard total weight, and means under the control of said devices for diverting sheets found to be non-standard in opacity or weight, to prevent their discharge at the discharge station.

17. In a machine for sorting sheets of paper or the like, in combination, means for moving a succession of sheets through the machine, and means for discharging at a standard sheet discharge station only those of said sheets which have all of their dimensions of a predetermined standard for each dimension, said last mentioned means including a device for testing the moving sheets of paper for thickness, a device for testing the moving sheets of paper for length, and a device for testing the moving sheets of paper for opacity at every point across each tested sheet, said opacity testing device including means responsive to non-standard transmission of light occasioned by a sheet of non-standard width, and means under the control of the aforesaid devices for diverting sheets found to be non-standard in thickness, length, or width, to prevent their discharge at the discharge station.

18. In a machine for sorting sheets of paper or the like, in combination, means for moving a succession of sheets through the machine, and means for discharging at a standard sheet discharge station only those of the said sheets which have a predetermined standard density uniformly throughout each sheet, said last mentioned means including a device for testing the moving sheets of paper for thickness at every point on each tested sheet, and devices for testing the moving sheet of paper for length and weight, and means under the control of said thickness, length, and weight testing devices for diverting sheets which are non-standard as to thickness, length or weight, to prevent their discharge at the discharge station.

19. In a machine for sorting sheets of paper or the like, in combination, means for moving a succession of sheets through the machine, and means for discharging at a standard sheet discharge station only those of said sheets which are of standard weight uniformly distributed at every point on each sheet, said last mentioned means including devices for testing the moving sheets of paper for thickness and opacity at every point on each tested sheet, and a device for testing the moving sheets of paper for weight to detect sheets having a total weight differing from the standard total weight, and means under the control of said devices for diverting sheets found to be non-standard in thickness, opacity, or weight, to prevent their discharge at the discharge station.

20. In a machine for sorting sheets of paper or the like, in combination, means for moving a succession of sheets through the machine, and means for discharging at a standard sheet discharge station only those of the said sheets which have a predetermined standard density at every point on each sheet, said last mentioned means including devices for testing the moving sheets of paper for length, opacity, and weight, and means under the control of said devices for diverting sheets found to be non-standard in length, opacity, or weight, to prevent their discharge at the discharge station, said opacity testing device being sensitive to non-standard opacity at any point on each sheet, and said weight-testing device comprising means directly responsive to the momentum of a moving sheet and means for delivering sheets of standard length to said momentum-responsive means with a predetermined uniform velocity.

21. In a machine for sorting sheets of paper or the like, in combination, means for moving a succession of sheets through the machine and means for discharging at a standard sheet discharge station only those of the said sheets which have uniform characteristics of thickness, length, opacity, and weight, said last-mentioned means including circuit-controlling devices for testing the sheets of paper for all of said characteristics, and means controlled by electrical circuits under control of the testing devices for diverting sheets non-standard as to each of said characteristics to prevent their discharge at the discharge station, said thickness and opacity testing devices being sensitive to non-standard conditions at any point on the surface of each sheet of paper, and said length testing device being sensitive to non-standard length at any point across the entire width of the sheet of paper.

22. In a machine for sorting sheets of paper or the like, the combination comprising paper-weighing means having a device which is directly responsive to the momentum of a moving sheet of paper and which has means for receiving and supporting a sheet of paper delivered endwise thereto, means for delivering successive sheets of paper endwise to the momentum responsive device of the weighing means with a predetermined uniform velocity, and means for conveying the successive sheets from the weighing means, including means for lifting and removing successive sheets from the sheet receiving and supporting means, and paper-handling devices controlled by the weighing means for directing the sheets of paper to a plurality of different destinations according to the determination of the weighing means.

23. In a machine for sorting sheets of paper or the like, the combination of claim 22 in which the means for delivering sheets to the weighing means includes a paper advancing device adapted to release each sheet of paper before the latter is received by the momentum responsive device, whereby the latter receives each moving sheet free of direct drive by the sheet delivering means.

24. In a machine for sorting sheets of paper or the like, the combination of claim 22 in which the weighing means is adapted to control the paper-handling devices in response to both under-weight and over-weight sheets for sorting the same from standard weight sheets.

25. In a machine for sorting sheets of paper or the like, means for moving a succession of sheets through the machine and means for discharging at a discharge station only those of said sheets which have a predetermined standard light-modifying character, said last-mentioned means including light-sensitive devices for successively testing each sheet of paper, one of said devices being adapted to test the sheet of paper for opacity by light transmitted through the paper, and another of said devices being adapted to test the sheet of paper for shade by light reflected by the paper, and means under the control of said testing devices for diverting, at a single point in the path of travel of the sheets, sheets which are non-standard as to opacity or shade, said diverting means including a relay device automatically settable under control of the light-sensitive testing device to which the sheets are first advanced in the machine, and in accordance with the operation of said testing device upon each of a plurality of successive sheets, and a paper-deflecting device controlled by said relay device, said relay device being timed for control of said last-mentioned device in accordance with the advance of sheets through the machine, whereby the first testing operation on a given sheet of paper may be initiated before completion of operation of the diverting means upon a previous sheet of paper.

26. In a machine for sorting sheets of paper or the like, means for advancing successive sheets of paper through the machine, length-testing means, and means controlled thereby for performing sorting operations on the sheets, said length-testing means including a pair of normally closed contact devices which are spaced length-wise of a sheet of paper advanced by the first mentioned means and each of which comprises contacting surfaces adapted for friction-free advance of a sheet of paper to and between the surfaces to mutually insulate them, and means adapted, under the electrical control of said devices, to control the sorting means in accordance with the presence or absence of a sheet of paper sufficiently long to open both said contact devices at once, each of said contact devices having its said contacting surfaces adapted for mutual contact on a predetermined line, said length-testing means being adapted for engaging the sheets of paper at said lines of contact and for there positively advancing the sheets, and each of said contacting surfaces being adapted, at its respective line of contact, to move with the advancing sheet of paper, for inertia-free advance of the sheet past the said lines of contact.

27. In a machine for sorting sheets of paper or the like, means including light-sensitive means adapted to inspect a predetermined area for testing visual characteristics of successive sheets of paper and paper-handling means controllable thereby, for effecting sorting operations upon the sheets in accordance with visual characteristics, means for advancing successive sheets of paper into said area for operation of said first-mentioned means on each sheet, and means including paper sheet-operated control devices respectively disposed beyond and behind said area in the direction of sheet travel, for rendering the first-mentioned means operative with respect to a sheet of paper advancing into said area, only when the sheet extends both beyond and behind the area.

EMILE JEAN FRANCOIS REY.